J. C. COONLEY.
WHIFFLETREE HOOK AND CLIP.
No. 190,007. Patented April 24, 1877.

Attest,
W. C. Corlies,
E. S. Lloyd.

Inventor,
John C. Coonley.
By Coburn & Thacher
Attys.

UNITED STATES PATENT OFFICE.

JOHN C. COONLEY, OF CHICAGO, ILLINOIS.

IMPROVEMENT IN WHIFFLETREE HOOKS AND CLIPS.

Specification forming part of Letters Patent No. 190,007, dated April 24, 1877; application filed March 26, 1877.

*To all whom it may concern:*

Be it known that I, JOHN C. COONLEY, of the city of Chicago, in the county of Cook and State of Illinois, have invented a new and useful Improvement in Whiffletree Hooks and Clips, which is fully described in the following specification, reference being had to the accompanying drawings, in which—

Figure 1:
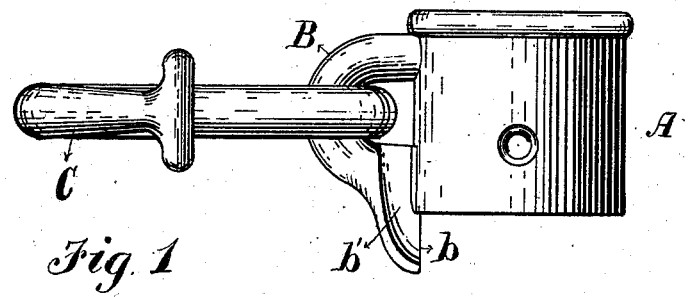
Figure 2:
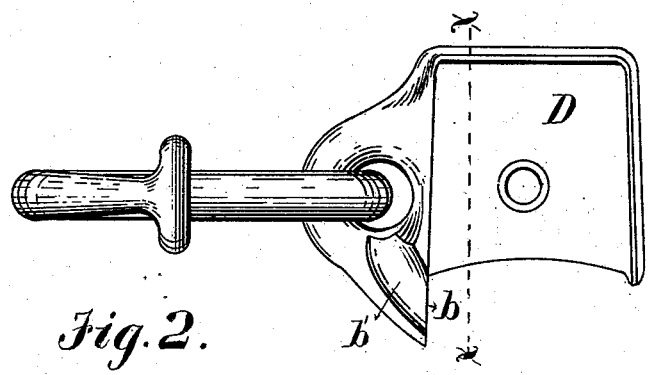

Figure 1 represents a plan view of a ring-ferrule and trace-hook for whiffletree-hooks; Fig. 2, a similar view of a clip and trace-hook similarly connected; and Fig. 3, a sectional view taken on the line $x\ x$, Fig. 2, the hook turned into position for attachment or detachment.

The object of my invention is construct the trace-hook and ring-ferrule or clip in such a manner that when detached from the whiffletree the hook can be readily disconnected from the clip or ferrule, but cannot be removed from the latter when fastened in place upon the end of the whiffletree.

The invention consists in making the ring of the trace-hook open or divided, and providing the clip or ring-ferrule with a suitable way, along which the divided ring may be conducted into the closed loop, this way or passage being also arranged so that it is closed when the ferrule or clip is attached to the whiffletree, thereby preventing the removal of the trace-hook.

In the drawings, A represents a ring-ferrule of the usual form, adapted to be driven upon and secured to the end of a whiffletree. A closed loop, B, is cast in one piece with the ferrule, upon one side thereof, to receive the trace-hook. This loop B is elongated on the side which is nearest the inner end of the ferrule when placed upon the whiffletree, so as to form a projection, $b$, which extends a little beyond the end of the ferrule. This projection or elongation of the loop is grooved on both sides, the grooves $b'$ leading from the portion extending beyond the ferrule into the loop, as shown in Fig. 1 of the drawings. The trace-hook C is of ordinary form; but the ring portion thereof is made with a small piece cut out, so as to form an opening, $c$. This opening is made of sufficient width to receive the narrow portion of the projection $b$, and the ends of the divided ring are constructed of such form as to fit in and slide along the grooves $b'$. It is evident, therefore, that when the ferrule is detached from the whiffletree the trace-hook may be connected and disconnected from the ferrule by turning it into the proper position to slip off and on the projections $b$ of the loop, the grooved portion of this projection passing into or out of the opening $c$ in the ring portion of the hook. When, however, the ferrule is driven upon the end of the whiffletree it is evident that the grooves leading into the loop will be closed by the projection $b$ resting against the body of the whiffletree, so that the trace-hooks cannot be disconnected from the ferrule when the latter is attached to the whiffletree.

The same construction of loop B may be applied to a clip instead of ferrule. This application is illustrated in Figs. 2 and 3 of the drawings, in which an ordinary clip, D, is represented with a loop constructed as described above, cast in one piece therewith.

Figure 3:
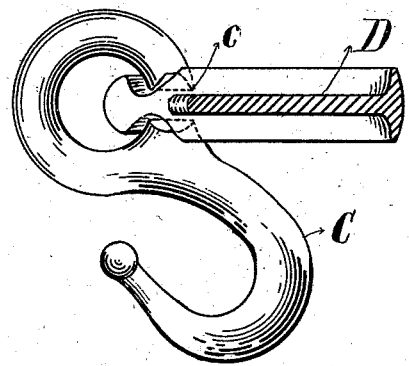

When the clip is detached from the whiffletree it is evident that the trace-hook and clip may be coupled and uncoupled, as described above, the hook being turned into the position shown in Fig. 3 of the drawings. The clip is secured to the ends of the whiffletree in the usual well-known way, and as the projection $b$ extends inward beyond the body of the clip, the grooved ways will be closed and the trace-hook prevented from slipping out from the loop, in the same way as above described.

Of course the direction of the grooves $b'$ in each case must be such that their outer termination is upon the inside of the projection $b$; otherwise they would not be closed up by the whiffletree, and the trace-hook might be disconnected from the loop, by accident or otherwise, without removing either clip or ferrule from the whiffletree.

The loop might be made with grooved ways leading directly out at one side, and the coupling and uncoupling of the trace-hook could then be accomplished, whether the clip or ferrule was attached to the whiffletree or not; but the trace-hook would not then be secured in the loop, and therefore it would not be a safety attachment like that shown and described.

Having thus described my invention, what I claim as new, and desire to secure by Letters Patent, is—

1. A ring-ferrule or clip provided with a closed loop cast in one piece therewith, and having grooves or depressions $b'$ upon both sides thereof, at its junction with the inner ends of the ferrule or clip, in combination with a trace-hook, C, the ring of which is provided with an opening, $c$, thereby adapting the hook and loop to be coupled and uncoupled, substantially as described.

2. The loop B, cast in one piece with a clip or ring-ferrule, and provided with a grooved projection, $b$, extending beyond the ferrule or clip at one end, at the inner edge of which the grooves $b'$ commence, so that the entrance to the latter is closed when the ferrule or clip is attached to the whiffletree, substantially as and for the purpose set forth.

JNO. C. COONLEY.

Witnesses:
L. A. BUNTING,
WILLIAM D. EWART.